Figure 1A:
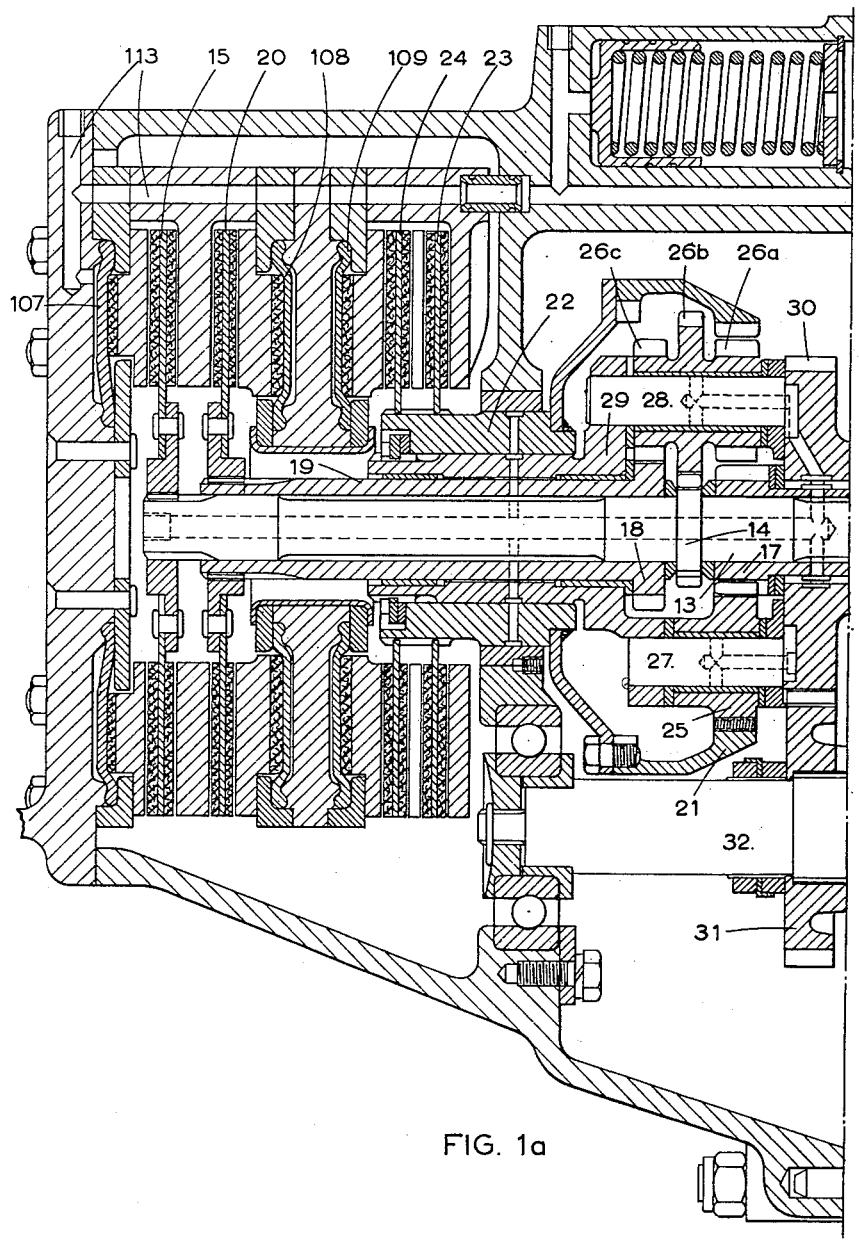

July 10, 1962 H. F. HOBBS 3,043,163
VARIABLE SPEED TRANSMISSION APPARATUS
Filed Aug. 12, 1959 5 Sheets-Sheet 1

HOWARD FREDERICK HOBBS
INVENTOR
By Irwin S. Thompson
ATTORNEY

July 10, 1962 H. F. HOBBS 3,043,163
VARIABLE SPEED TRANSMISSION APPARATUS
Filed Aug. 12, 1959 5 Sheets-Sheet 3

HOWARD FREDERICK HOBBS
INVENTOR
By Irwin S. Thompson
ATTORNEY

July 10, 1962 H. F. HOBBS 3,043,163
VARIABLE SPEED TRANSMISSION APPARATUS
Filed Aug. 12, 1959 5 Sheets-Sheet 5

HOWARD FREDERICK HOBBS
INVENTOR
By Irwin S. Thompson
ATTORNEY 3,043,163
VARIABLE SPEED TRANSMISSION APPARATUS
Howard Frederick Hobbs, Leamington Spa, England, assignor to Hobbs Transmission Limited, Leamington Spa, England, a British company
Filed Aug. 12, 1959, Ser. No. 833,250
Claims priority, application Great Britain Aug. 19, 1958
6 Claims. (Cl. 74—767)

This invention relates to variable speed transmission apparatus for motor vehicles of the kind in which the final drive, i.e., crown wheel and differential is built into the variable speed gearbox and arranged so that the two output shafts which drive either the front wheels of the vehicle or the rear wheels of the vehicle are positioned at right angles to the input shaft or main axis of the gearbox and close to the engine on which the transmission is mounted. The crown wheel and differential are usually located between the input clutch and the gearing of the gearbox. This has now become a common arrangement particularly for medium and small cars, either for front wheel drive or for rear-engined vehicles having rear wheel drive. In such an arrangement there are certain serious space and position limitations, but transmissions of the synchromesh or other lay-shaft types can be satisfactorily designed.

The object of the present invention is to provide a transmission system of this kind which effects gear ratio change automatically and minimises the difficulties of space and position of the engine and output shafts and enables the present types of manually controlled units to be readily replaced by automatic transmission apparatus.

According to the invention an automatically variable power transmission unit comprises clutch means having a rotary input member and two clutch members engageable simultaneously with said input member and each of which can be so engaged without engaging the other, a differential gear which drives two gear output shafts, a crown wheel and pinion for driving said differential gear, a pinion shaft, a planetary gear train and a number of reaction brakes, the planetary gear train comprising a number of rotary elements viz, a cage, pinions of differential size carried by spindles on the cage on axes offset from the cage axis, sun-wheels meshing with certain of said pinions, and a ring-gear meshing with certain of said pinions; at least two said elements acting as input members and being connected with the two clutch members another of said elements acting as an output member and being geared to the pinion shaft, other of said elements being connected to the reaction brakes, whereby engagement of one of the clutch members simultaneously with one of the brakes provides one ratio engagement of both of the clutch members provides another ratio, and engagement of the other clutch member and one of the brakes provides a reverse ratio.

Figure 1B:
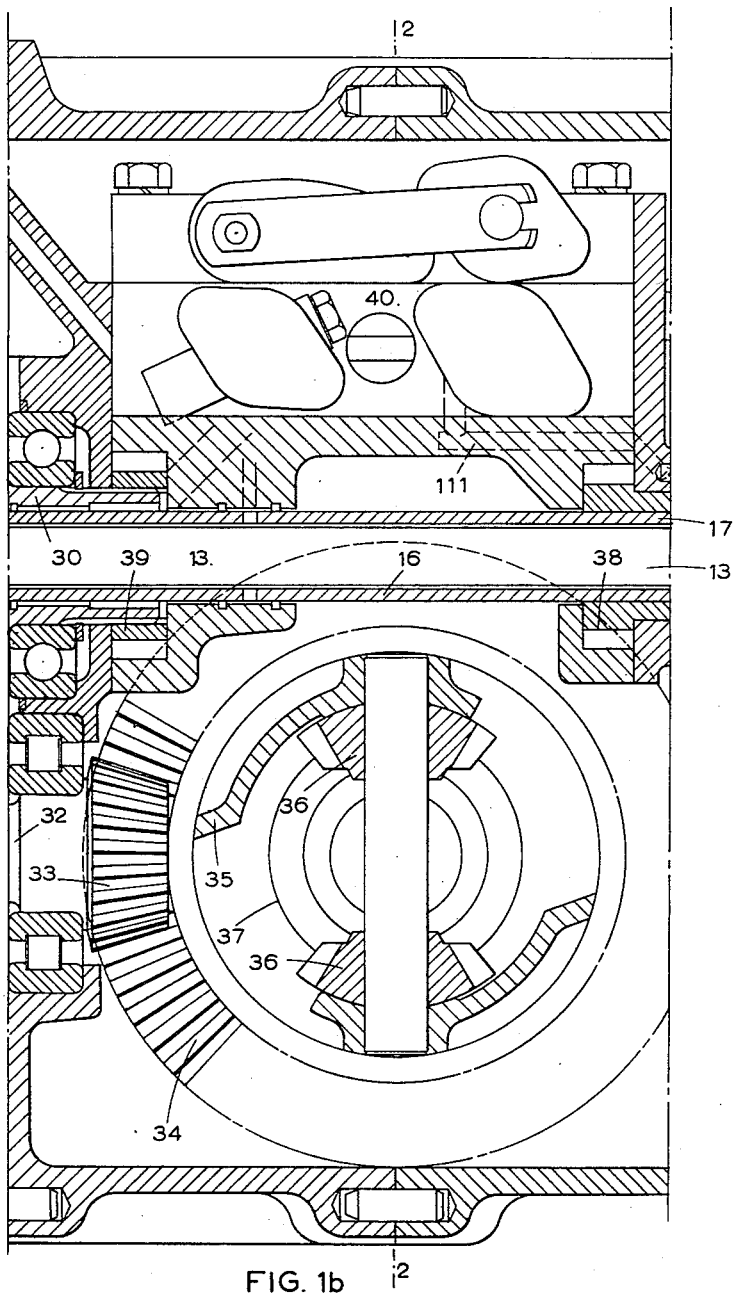
Figure 1C:
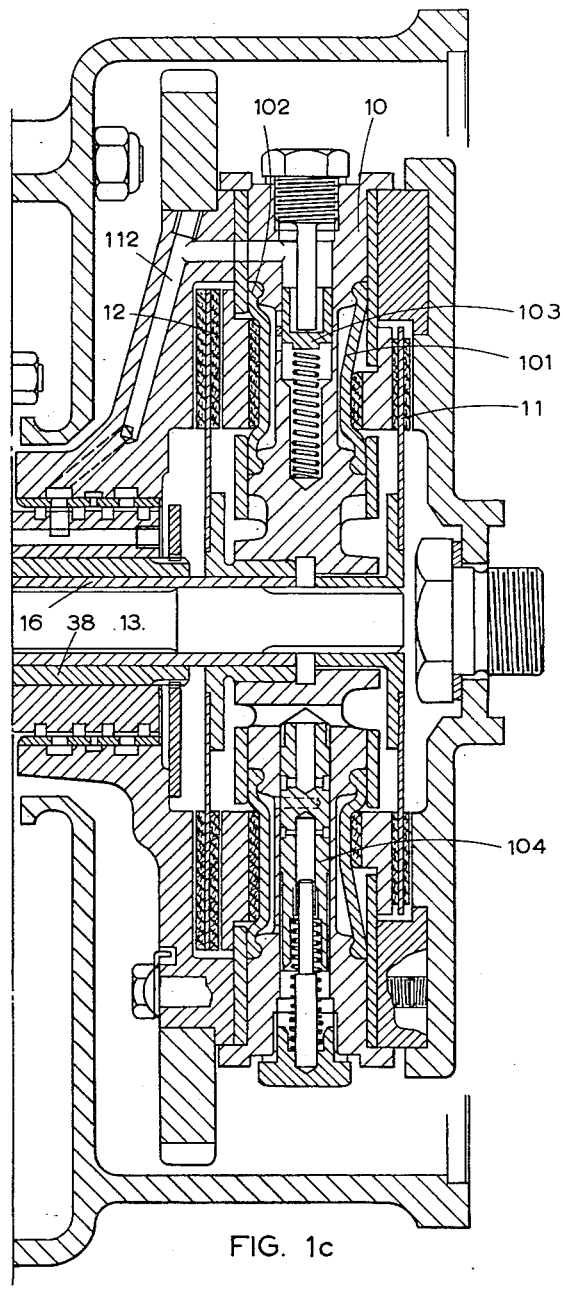
Figure 2A:
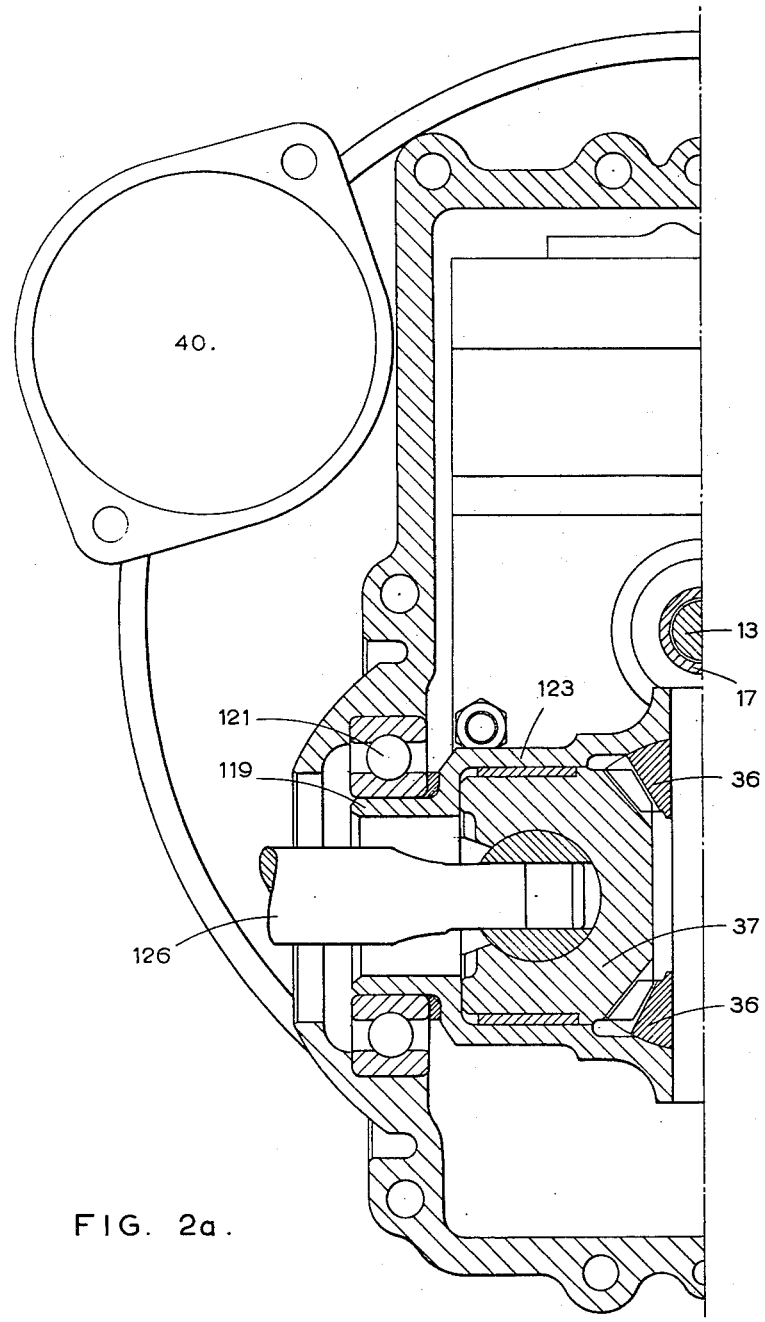
Figure 2B:
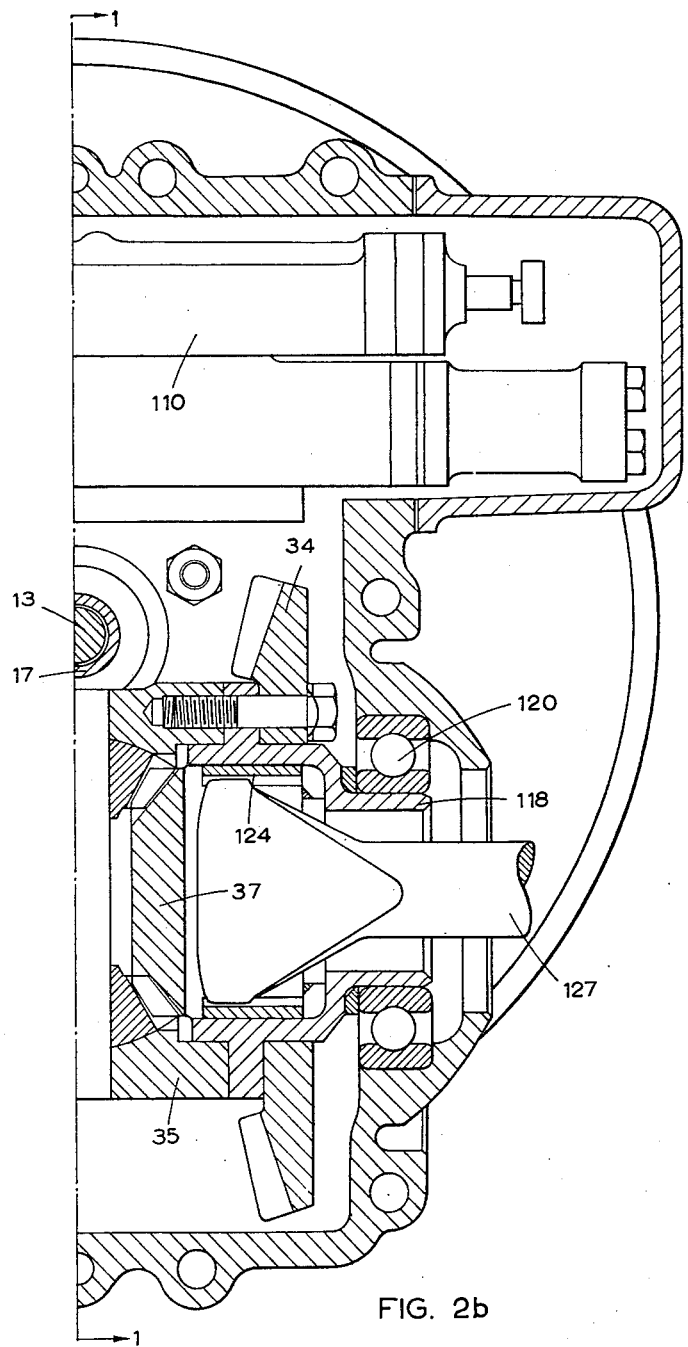

Two constructional forms of the invention will now be described by way of example with reference to the accompanying diagrammatic drawings wherein:

FIGURES 1A, 1B and 1C together constitute a longitudinal sectional view of a power transmission apparatus made in accordance with the invention; and FIGURES 2A and 2B together constitute a cross-sectional view thereof.

A fixed casing 9 contains a rotary input clutch unit 10 which will be attached to the crankshaft of an engine. The clutch engaging action is effected by introducing liquid under pressure on one side of each of two flexible diaphragms 101, 102 under control of valves 103, 104. The construction of the clutch and valves is fully described in the specifications of earlier patents e.g. a description of the clutch and valves 103, 104 is in British patent specifications Nos. 649,589, 707,313 and 673,737.

The clutch unit 10 embodies two clutches having spinner plates 11, 12 that can be clutched to the rotary unit 10. The clutch has two clutch members in the form of a shaft 13 and sleeve 16. The clutch plate 11 is mounted on the shaft 13, which carries a sun-wheel 14, and the spinner plate 15 of a reaction brake. The clutch plate 12, is mounted upon the sleeve 16 which surrounds the shaft 13 co-axially therewith and carries a sun-wheel 17. A sun-wheel 18 is formed on a sleeve 19 which carries a spinner plate 20 of a reaction brake. A ring gear 21 is attached to a sleeve 22 which carries two brake spinner plates 23, 24. The brakes are engageable by introducing liquid behind flexible diaphragms 107, 108, 109, by means of channels such as 113 as described in the specification of earlier patents, e.g. British Patent No. 649,589.

There are two sets of planetary pinions viz. one set consisting of two or more pinions 25 of the same size mounted on spindles 27 and the other set consisting of two or more wheels each formed with three pinions 26a, 26b, 26c mounted on spindles 28. The spindles 27, 28 are carried by a cage 29. The set of pinions 25 mesh with the ring gear 21 and the pinion 26a, the pinion 26b meshes with the wheel 14 and the 26c meshes with the sun-wheel 18. The ring gear 21, sun-wheels 14, 18 and the planetary pinions together constitute a planetary gear giving the required number of transmission ratios. The cage 29 carries a gear 30 which meshes with gear 31 carried by a pinion shaft 32 which also carries a bevel gear 33, and this meshes with a crown wheel 34. The crown wheel is fixed to a cage 35 which in turn carries the differential gear pinions 36, meshing with the differential gear wheels 37.

The two differential gears 37 are rotatably mounted in bearings 123, 124 in the cage 35 and are attached to two output shafts 126, 127 which have bearings in the hubs 118, 119 and can be used to drive two of the road wheels of a vehicle. The two output shafts 126, 127 have their axes at right angles to the axis of the clutch output shafts 13, 16. The reaction brake plates 15, 20, 23, 24 can be clutched to stationary parts of the gearbox.

The clutch and brakes of the transmission are actuated by hydraulic pressure which is provided by a gear pump 38. The gear pump 38 is driven from the clutch unit 10 and another gear pump 39 is driven from the planetary cage 29. A hydraulic unit 40 contains relief valves for controlling the pressure provided by the pump 38, a selector valve which may be moved manually to select engagement of the clutches and brakes, a governor valve which is moved automatically by means of the pressure and delivery of the pump 39, a kickdown valve to vary the speeds at which the governor valve is shifted automatically and a tow start valve which opens the delivery from pump 39 to the clutches and/or brakes, when the pump 38 is stationary. The clutches 11, 12 have valves 103, 104 which allow the oil pressure to escape while the engine is idling.

The automatic means 40 for controlling the supply of liquid to the diaphragms of the clutches through ducts such as 111, 112 and the brakes are known from the specifications of earlier patents, e.g. British Patent No. 738,588.

In operation when the clutch plate 12 is engaged as well as the brake plates 23, 24 first speed ratio is provided. If the engine speed is increased beyond a predetermined degree the valve 104 moves outwards causing the clutch 12 to transmit the power and the crown wheel and wheels of the vehicle to be driven at low speed in said first ratio. If the brake 23, 24 is disengaged and the brake 20 engaged the transmission will shift into 2nd ratio, and if the brake 20 is disengaged and the brake 15 engaged the transmission will shift into 3rd ratio. If the brake 15 is disengaged and both the clutches 11, 12 are engaged simultaneously the transmission will operate in 4th ratio which provides direct drive.

The apparatus is so arranged that the crown wheel and differential are disposed between the ends of the shafts 13, 16 to one side thereof, with the input clutches 11, 12 on one side of the output shafts 126, 127 and the planetary gear 29 etc. and reaction brakes 15, 20, 23, 24 on the other side of the output shafts, the planetary gear being disposed between the output shafts 126, 127 and the reaction brakes. The pinion shaft 32 is in the same longitudinal region as the planetary gear but at a greater radius and is geared to said planetary gear by the engagement of a single gear wheel 31 with a gear that surrounds the input shafts 13, 16.

If desired the pinion 33 and crown wheel 34 may have hypoid spiral or helical teeth. Also if desired the shaft 32 may have its axis at an angle to the shafts 13, 16.

I claim:

1. In an automatically variable power transmission apparatus comprising two coaxial input clutches mounted on an axis and engageable simultaneously, one of which can be engaged without engaging the other, a planetary gear train comprising at least three sun-wheels and a cage, all co-axial with said axis of said clutches, at least one set of three planetary pinions of different sizes fixed together and carried by the cage on one planetary axis, and at least one other pinion carried by said cage on another planetary axis and meshing with the first of the set of pinions; two of said sun-wheels being drivably connected with said clutches respectively and meshing one with said other pinion and the other with the second of said set of pinions; the third sun-wheel meshing with the third of said set of pinions; the provision of a gear system including a gear wheel mounted on an output shaft and means drivably connecting the planetary gear train with said gear wheel; and three reaction brakes connected respectively with one of said clutches, said third sun-wheel and said other pinion, said reaction brakes being located on one side of said planetary gear train coaxially with said clutches, and said clutches being located on the other side of said planetary gear train; a further pinion on said output shaft, a crown wheel engaged by said further pinion, and a differential gear engaged by said crown wheel, the axis of said differential gear being at right angles to the axis of said clutch members, said further pinion driving the crown wheel and the crown wheel driving said differential gear, said crown wheel having its axis transverse to and offset from the axis of said clutches; said crown wheel and differential gear being located between the clutches and the planetary gear train.

2. An apparatus according to claim 1 wherein the further pinion is a hypoid gear.

3. An apparatus according to claim 1 wherein the crown wheel and further pinion are spiral bevel gears.

4. An apparatus according to claim 1 wherein said output shaft is parallel to and adjacent the planetary gear and said gear wheel carried by said output shaft is in mesh with a further gear wheel connected with the cage.

5. An apparatus according to claim 1 wherein the further pinion is carried by said output shaft which is at an angle to but adjacent the planetary gear and carries said gear wheel which is in the form of a spiral bevel gear wheel that is in mesh with another spiral bevel gear wheel connected with the cage.

6. An apparatus according to claim 1 wherein the crown wheel and differential gear are disposed with the clutches at one end and the planetary gear and brakes at the other end thereof, the planetary gear being disposed between the crown wheel and the reaction brakes.

References Cited in the file of this patent

UNITED STATES PATENTS

| | | |
|---|---|---|
| 616,267 | Smith | Dec. 20, 1898 |
| 918,658 | Coffee | Apr. 20, 1909 |
| 1,256,374 | Rowledge | Feb. 12, 1918 |
| 1,619,876 | Mason | Mar. 8, 1927 |
| 2,603,108 | Carlson | July 15, 1952 |
| 2,737,824 | Livermore | Mar. 13, 1956 |
| 2,776,572 | Walter | Jan. 8, 1957 |
| 2,794,350 | Hart | June 4, 1957 |
| 2,855,806 | Fallon | Oct. 14, 1958 |